United States Patent
Kerpez

(10) Patent No.: US 6,430,199 B1
(45) Date of Patent: Aug. 6, 2002

(54) METHOD AND SYSTEM FOR DISTRIBUTING TELEPHONE AND BROADBAND SERVICES OVER THE COPPER PAIRS WITHIN A SERVICE LOCATION

(75) Inventor: Kenneth James Kerpez, Long Valley, NJ (US)

(73) Assignee: Telcordia Technologies, Inc., Morristown, NJ (US)

(*) Notice: Subject to any disclaimer, the term of this patent is extended or adjusted under 35 U.S.C. 154(b) by 0 days.

(21) Appl. No.: 09/050,221

(22) Filed: Mar. 27, 1998

(51) Int. Cl.[7] .......................... H04J 1/02; H04M 11/00
(52) U.S. Cl. ............... 370/493; 379/93.14; 379/93.28; 379/90.01; 379/93.01
(58) Field of Search ....................... 370/493–495, 370/535, 537, 400, 270, 271, 352–356; 375/222, 260; 379/93.28, 90.01, 93.01, 93.04, 93.14, 93.09, 93.11, 93.08

(56) References Cited

U.S. PATENT DOCUMENTS

| | | | |
|---|---|---|---|
| 5,504,816 A | * 4/1996 | Hamilton et al. | 380/217 |
| 5,668,857 A | * 9/1997 | McHale | 379/93.07 |
| 5,696,790 A | 12/1997 | Graham et al. | 375/238 |
| 5,889,856 A | * 3/1999 | O'Toole et al. | 370/480 |
| 6,061,357 A | * 5/2000 | Olshansky et al. | 370/401 |
| 6,088,385 A | * 7/2000 | Liu | 375/219 |
| 6,088,430 A | * 7/2000 | McHale | 379/93.28 |
| 6,101,216 A | * 8/2000 | Henderson et al. | 375/222 |
| 6,160,843 A | * 12/2000 | McHale et al. | 375/222 |
| 6,163,599 A | * 12/2000 | McHale | 379/93.28 |

OTHER PUBLICATIONS

Interfaces and System Configurations for ADSL: Customer Premises, The ADSL Forum TR–007, Feb. 1998.
Network and Customer Installation Interfaces; Asymmetric Digital Subscriber Line (ADSL) Metallic Interface, ANSI T1.413–1998.

* cited by examiner

*Primary Examiner*—Ajit Patel
*Assistant Examiner*—Hanh Nguyen
(74) *Attorney, Agent, or Firm*—Joseph Giordano

(57) ABSTRACT

A method and system for distributing broadband digital and telephone signals arriving at a subscriber's home simultaneously over existing in-house four wire quad cable. The combined telephone and broadband signals entering the house are split upon entering the house and the broadband signals are converted to a locally generated broadband digital signal whose power spectral density is not distorted by recovery of the telephone signal, such as a 10Base-T signal. The locally generated combined broadband digital signals and telephone signals are distributed to broadband transceivers where the telephone signals and broadband digital signals are applied to telephones and broadband service termination devices, respectively.

15 Claims, 2 Drawing Sheets

METHOD AND SYSTEM FOR DISTRIBUTING TELEPHONE AND BROADBAND SERVICES OVER THE COPPER PAIRS WITHIN A SERVICE LOCATION

FIELD OF THE INVENTION

This invention is related to the distribution of broadband services within a subscriber's service location and more specifically to distributing telephone and broadband services within a subscriber's service location using the existing copper pairs already located within the service location.

BACKGROUND OF THE INVENTION

Due to the tremendous costs associated with ubiquitous deployment of fiber in a subscriber loop it is extremely desirable to use the existing subscriber loop plant to carry both plain old telephone service (POTS) and broadband services such as internet data, digital video, and multimedia services. Asymmetric Digital Subscriber Line (ADSL) technology has demonstrated the viability of a subscriber loop twisted pair cable to carry both ADSL and POTS or narrowband signals. By ADSL technology a broadband signal, called an ADSL signal, and POTS signals are multiplexed by a device called an ADSL POTS splitter and transmitted from a service provider's central office over the subscriber loop to the subscriber location, e.g. a residential unit or home. An ADSL POTS splitter at the subscriber's residence demultiplexes and transmits the POTS signal onto one wire pair and transmits the ADSL signal onto a separate wire pair. The POTS signal is terminated on a telephone and the ADSL signal is terminated on an ADSL remote terminal unit, known in the art as an ATU-R. Current ADSL systems can deliver up to 8,000,000 b/s (8 Mb/s) to a subscriber's residence.

Once a high bit rate digital signal reaches the subscriber's residence, as in an ADSL signal over the outside plant twisted pairs, it still needs to be distributed within that location. Although ADSL has been demonstrated to be viable technology for the twisted pairs residing outside the home, ADSL is neither technically nor economically attractive for distribution within the home. For one, the price of ATU-Rs will preclude a subscriber from having more than one ATU-R per subscriber residence or location. Secondly, within the subscriber service location ADSL is also particularly susceptible to high frequency noise that is generated within the home and from sources outside the home, e.g., AM radio stations, because the cable within the home is often untwisted. As a result broadband digital networks such as 10Base-T, 100Base-T, ATM, and IEEE 1394 will increasingly be installed in service locations to distribute the aforementioned broadband services. These broadband digital networks will have to be more cost effective to deploy within a residence and should not suffer from the technical limitations of ADSL.

Because an overwhelming majority of service locations are already wired with existing telephone house wiring or cable it would prove extremely cost effective to be able to distribute the aforementioned broadband digital signals over this existing telephone cable within the residential unit. Residential telephone cable is often in a sheath with four untwisted conductors or wires. These wires have various names including quad, station wire, phone wire and telephone station wire. Quad contains black, green, red, and yellow insulated copper conductors. Typically the green and red conductors are paired together and used for a first plain old telephone service (POTS) line. The yellow and black conductors are also typically paired together for a second POTS line.

Conventional wisdom has precluded use of residential cable for carrying broadband services if that cable is already being used to carry POTS. For example, 10Base-T requires two pairs of wire for transmission, one pair for transmit and one pair for receive. As a result, the prior art suggests that if a quad cable carries 10Base-T then the cable has no additional capacity for carrying POTS and vice versa. As such, it is thought that additional and separate cabling, e.g., coaxial cable, will be required at the service location to carry the broadband services.

It is therefore an object of the present invention to provide a method and apparatus that allows POTS signals and broadband signals to be simultaneously carried on existing quad cable at the service location.

SUMMARY OF THE INVENTION

My invention involves an apparatus, namely a broadband transceiver, that allows one or two POTS lines and a broadband signal all to be carried simultaneously on two untwisted pairs of copper wire within a service location. My invention combines a POTS signal and a broadband signal on a single pair of wires by frequency division multiplexing. Both signals are therefore isolated from each other and can be transmitted to their ultimate destination in the service location. The same apparatus also demultiplexes the POTS signal and the broadband signal carried on a single pair of wires by frequency division multiplexing.

Accordingly it is an aspect of my invention to distribute POTS and broadband signals within a subscriber home over a single quad cable. By frequency division multiplexing and demultiplexing the narrowband or telephone and the broadband signals on broadband transceivers at convenient points within the subscriber location each telephone or broadband termination device, e.g., a computer or high definition television, is able to receive, respectively, a telephone or broadband signal.

In accordance with my invention, a broadband transceiver can be used in conjunction with ADSL technology to distribute the broadband signal carried by an ADSL at the subscriber location providing a much more cost effective method for distribution of broadband signals, and in particular ADSL signals, within the home. For example, by my invention a subscriber is required to purchase only one ADSL POTS splitter and one ATU-R in order to support a plurality of broadband termination devices and telephones installed within the subscriber residence.

Significantly both POTS and broadband digital traffic can advantageously be simultaneously carried on existing residential telephone cables or quads. As a result a subscriber may be provided with up to three services over existing residential telephone cable. For example, a subscriber may have access to two POTS lines and one ADSL data line.

Accordingly, my invention includes a method for distributing narrowband and broadband signals arriving at a subscriber service location using the existing copper wires located within the subscriber service location and including the steps of receiving and separating the narrowband and broadband signals within the location; in response to the broadband signals generating a broadband digital signal operating at frequencies greater than 1,000,0000 Hz (1 MHz); combining said narrowband and said broadband digital signals at a first broadband transceiver; uncombining said combined narrowband and broadband digital signals at a second broadband transceiver; and applying the narrowband and broadband digital signals egressing the second broadband transceiver separately to the appropriate service termination devices. While my invention is most advantageously utilized to distribute within a residence the narrowband and broadband signals transmitted, as by ADSL signals, from the outside plant, it may also be employed for distribution of broadband signals originating within the residence.

BRIEF DESCRIPTION OF THE DRAWINGS

These and other advantageous features of my invention can be under stood from the following detailed description together with the accompanying drawings, in which.

DETAILED DESCRIPTION

Figure 1:
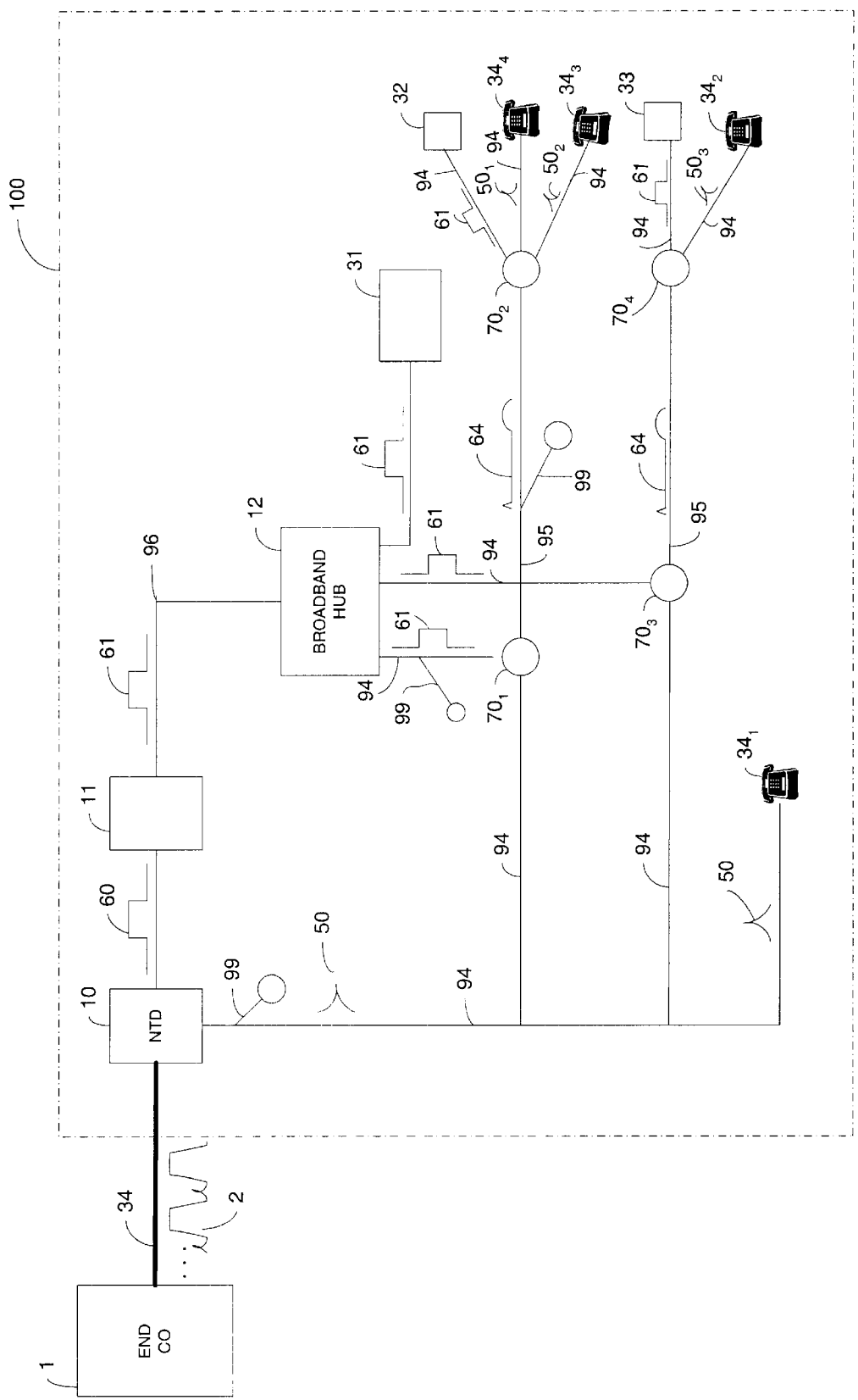
FIG. 1 depicts an illustrative embodiment of my invention including broadband transceivers distributing broadband and telephone signals to service termination devices.

Turning now to FIG. 1, there is illustratively depicted a possible architecture for distributing broadband and telephone services within a subscriber service location 100 in accordance with my invention. End central office (End CO) 1 transmits and receives combined narrowband and broadband signals 2 between subscriber location 100 over twisted pairs 34. As the combined signal 2 enters the subscriber location, it is terminated by network termination device (NMD) 10 where it is uncombined or split into narrowband signal 50 and broadband signal 60. Narrowband signal 50 is routed along quad cable 94 to other locations within location 100 and is either combined by broadband transceivers 70 or is terminated on telephone 34. Broadband signal 60 may be coupled to a converter device 11, as shown in FIG. 1, or may be coupled directly to a broadband hub 12. The broadband hub 12 generates broadband digital signal 61 which is distributed to the broadband transceivers 70 or directly to a broadband termination device 31. Broadband transceivers $70_1$ and $70_3$ then combine the narrowband signal 50 with broadband digital signal 61 and transmit a combined signal 64 on the quad cable 95 to broadband transceivers $70_2$ and $70_4$, respectively. Broadband transceivers $70_2$ and $70_4$ then uncombine the combined broadband and narrowband signals 64 and transmit the broadband signal 61 to collocated termination devices 32 or 33 and the narrowband signal 50 to collocated telephones 34. It is another aspect of my invention that broadband signals 61 egressing broadband termination devices 32 and 33 are combined with narrowband signals 50 and transmitted to the broadband transceivers 70 which in turn couple the broadband signals, through hub 12 and the narrowband signals 50 to the network termination device 10 for transmittal to end CO 1 over twisted pair 34.

As can be seen by reference to FIG. 1, the network termination device 10 uncombines or splits service provider signal 2 into a narrowband signal 50 and a broadband signal 60. Narrowband signal 50 is a telephone signal whose power spectral density is below 4,000 Hz (4 kHz). It is known in the art that narrowband signal 50 typically requires a guard band extending up to about 20 kHz to separate it from broadband signal 60. Broadband signal 60 may be coupled to converter device 11 or may be coupled directly to broadband hub 12. If broadband signal 60 is compatible with signals accepted by broadband hub 12, then converter device 11 is not needed and broadband signal 60 is coupled directly to broadband hub 12. On the other hand, where broadband signal 60 is incompatible with signals accepted by broadband hub 12, converter device 11 converts broadband signal 60 to a broadband digital signal 61.

In the specific illustrative embodiment of FIG. 1 network termination device may, for example, be an ADSL POTS splitter and thus would generate an ADSL broadband signal 60. This ADSL broadband signal 60 is applied to the converter 11, which is an ADSL remote terminal unit (ATU-R) which converts the ADSL signal 60 to a different broadband digital signal 61 suitable for distribution in accordance with my invention.

In the specific illustrative embodiment of FIG. 1 ATU-R 11 advantageously converts the ADSL broadband signal 60 to a 10Base-T signal 61 and couples the 10Base-T signal 61 to broadband or 10Base-T hub 12. 10Base-T signals are Manchester coded so their power spectral density peaks at 10,000,000 Hz (10 MHz) and therefore any filtering done to recover narrowband signal 50 will not distort 10Base-T signal 10 significantly enough to prevent recovery of the subscriber broadband information. Broadband hub 12 can also be any device which generates a broadband signal 61 which can be recovered in the presence of narrowband signal 50. Therefore, any digital signal having a power spectral density with an insignificant amount of power below 4,000 Hz (4 kHz) can be employed in accordance with my invention. For example, broadband signal 61 can be a 1,000,000 b/s (1 Mb/s) signal whose spectral density permits recovery of the broadband information after recovery of narrowband signal 50. On the other hand, broadband signal 61 could not be a narrowband ISDN signal whose power spectral density overlaps and essentially coincides with narrowband signal 50. A system in accordance with my invention can utilize any digital signal that operates at frequencies greater than 1,000,000 (1 MHz) or transmission at digital data rates greater than 1 Mb/s. This includes the following digital signals operating at the frequencies indicated below:

10Base-T (10 Mb/s, operating frequencies up to 20 MHz)

ATM-25 (25 Mb/s, operating frequencies up to 25 MHz)

100Base-T, Fast Ethernet (100 Mb/s, operating frequencies up to 125 MHz)

ATM-155 (155 Mb/s, operating frequencies up to 155 MHz)

IEEE 1394 (100+ Mb/s, operating frequencies up to 100 MHz and higher)

Gigabit Ethernet (1 Gb/s, operating frequencies not yet specified)

Fibre Channel (up to 200 Mb/s on copper, operating frequencies up to 250 MHz)

Although FIG. 1 depicts an illustrative embodiment where the narrowband signal 50 and broadband signal 60 are both generated by a service provider, my invention may also be used to distribute a locally generated broadband signal 60 along with a network provided narrowband signal within the service location 100.

10Base-T hub 12 is preferably arranged in a star topology with the hub 12 at the center of the star. The hub 12 can be at any convenient location within service location 100, and it should not be difficult to locate hub 12 at a point where all the telephone wiring, including twisted pairs 34 and quad cable 64, can be accessed to form a star topology. Existing in-home telephone wiring, illustratively depicted in FIG. 1 as cables or lines 94 and 95, is often connected in a tree-branch topology, which may need to be modified for 10Base-T transmission. Tree-branch wiring has unterminated branches connected to lines 94 and 95 known as bridge taps 99. 10Base-T signals 61 distributed in accordance with the present invention have been found to function properly only if bridge taps 99 are short. Thus, any bridge taps 99 located on wire which 10Base-T signals 61 traverse will either need to be removed or isolated from the 10Base-T wiring 64 by the low pass filter portion of ADSL POTS splitter 10.

The next step in distributing signal 61 and telephone signal 50 is combining the signals at a broadband transceiver 70. 10Base-T signal 61 is Manchester coded, so its power is concentrated at high frequencies with a peak power near 10 megahertz (MHz). Telephone signal 50 is at frequencies below 4,000 hertz (4 kHz). Thus, 10Base-T signal 61 and telephone signal 50 can be combined on a single wire pair by frequency-division multiplexing (FDM) by a device such as transceiver 70.

Figure 2:
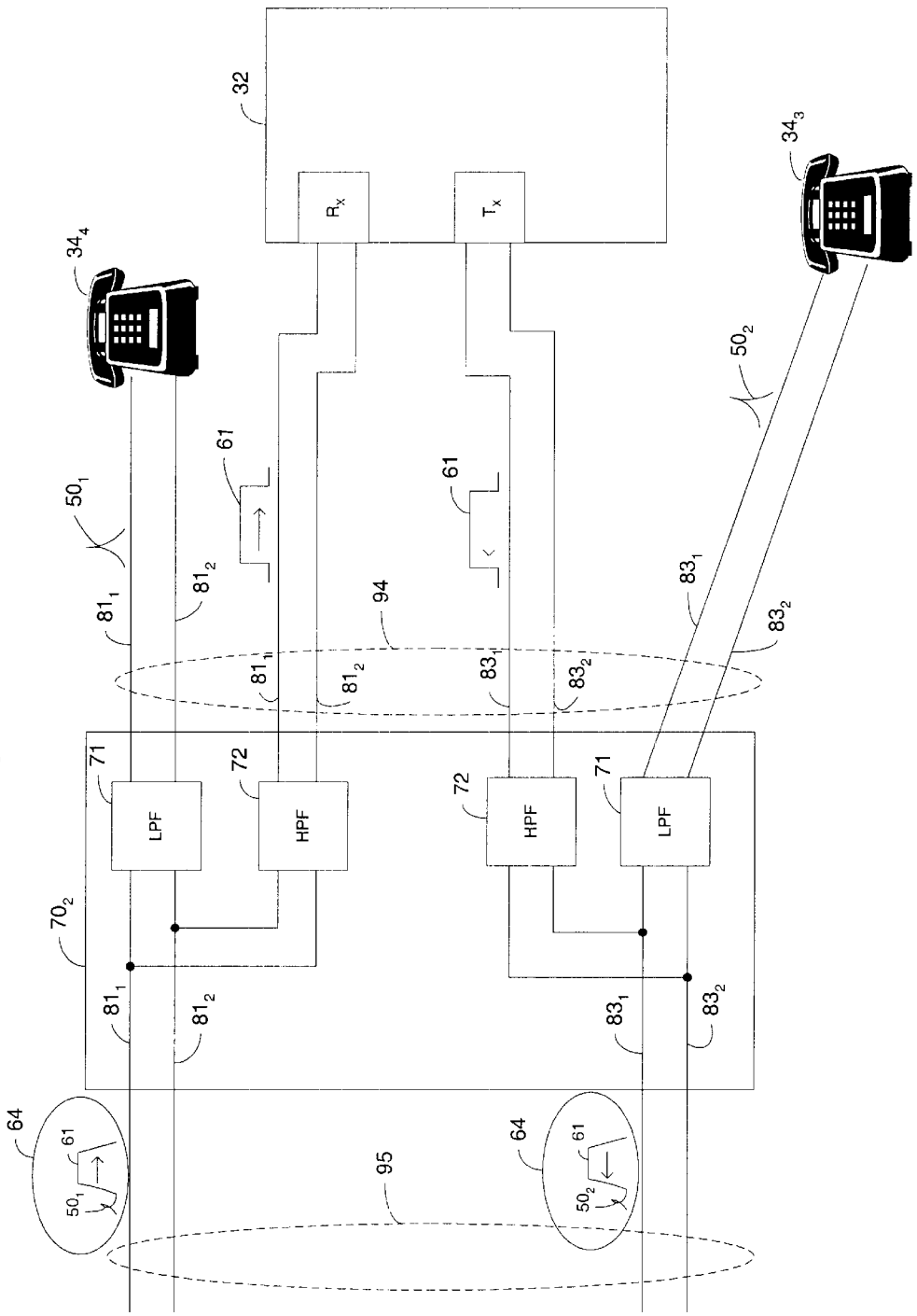
FIG. 2 depicts an illustrative embodiment of a broadband transceiver.

Turning to FIG. 2 where is depicted a specific illustrative embodiment of the transceiver $70_2$, there is shown low pass filters (LPF) 71 which isolate the telephone 34 and the POTS signal 50 from the wire pairs 95. High pass filters (HPF) 72 isolate each 10Base-T transmitter and receiver from the wire pairs 94 and 95. By this arrangement a transceiver 70 can isolate 10Base-T equipment 32 from POTS signal 50, and the POTS equipment 34 is isolated from 10Base-T signal 61. The isolated signals are then coupled to the telephones 34 and the broadband equipment 32. Any two wire pairs in a quad cable 95 may simultaneously carry 10Base-T signals and up to two distinct POTS signal as shown in FIG. 2. Specifically, 10Base-T transmit signals could be carried on the green/red wire pair $83_1$, $83_2$ within an RJ-11 connector. 10Base-T receive signals could be carried on the yellow/black pair $81_1$, $81_2$ of an RJ-11 connector. The first and second POTS line could be carried on the green/red 83 and yellow/black 81 wire pairs, respectively.

Broadband transceivers 70 can also used for combining the signals as illustrated in FIG. 2. Although this disclosure limits discussion of combining and uncombining 10Base-T with POTS signal, those skilled in the art will readily appreciate that any broadband digital signal whose power is concentrated at frequencies advantageously on the order of 1 MHz or higher can be incorporated into the design of transceiver 70 by substituting different filters 71 and 72 for those described above. Those skilled in the art will immediately note that the transceiver 70 is a passive device and will therefore be significantly less expensive than an ATU-R. Current projections estimate the cost of an ATU-R to be about $200.00. My transceiver 70 will cost about $20 given that all the devices included therein are passive devices that do not need to be powered.

As can be seen by reference to FIG. 1 convenient placement of transceiver 70 allows for distribution of broadband digital signals, such as the 10Base-T signals 61 and telephone signals 50 throughout the service location 100. Advantageously, service termination devices 32, 33 and 34 would be collocated with a transceiver 70 which transmits and receives information carried on wire pair 95 to and from intermediate transceivers $70_1$ and $70_3$ which are then coupled by wire pair 94 to the hub 12 and the user termination device, i.e., the ADSL POTS splitter, 10.

I have found that 10Base-T signals 61 distributed in accordance with the present invention can be transmitted error-free over a continuous length of 100 meters (328 feet) of quad cable 64. Computer simulations have verified that the present method of distributing broadband signals within the service location will function properly. It has been found that many in-home telephone cables 64 have approximately the same performance as Category 3 cable specifications. The computer simulations calculated the average bit error rate (BER) performance of 10Base-T transmitted over 100 meters of Category 3 type cables. Specifically, the simulation compared the performance of 10Base-T on cable 64 with and without the ADSL POTS splitter 10. The simulation resulted in the conclusion that the filtering done by an ADSL POTS splitter had negligible impact on the 10Base-T signal BER. Thus, an in home broadband distribution system designed in accordance with my invention will not affect 10Base-T transmission. Although the performance of POTS signal 50 was not calculated as part of this simulation, low frequency POTS signals are not expected to be affected by high-pass 10Base-T signals.

In accordance with prior in-house distribution arrangements combined ADSL signals 60 and POTS signals 50 go to service terminal devices 31, 32 and 33 in the subscriber location 100 without any intervening signal conversion except for ADSL POTS splitter 10. With these arrangements, the ADSL signal 60 must traverse at least some portion of inside wiring 94. Existing inside telephone wire is often routed near AC power lines and can be very noisy. Downstream ADSL signals 2 sometimes traverse long subscriber loops 34 and arrive at the home 100 with low signal power. This combination of high noise power and low signal power will cause the information carried by some ADSL signals 60 to be unrecoverable if the ADSL signal 60 is carried on long lengths of inside wiring 94. On the other hand, in accordance with my invention, the relatively high signal power level of 10Base-T generated within the home assures that the 10Base-T signal is capable of delivering broadband information routed on inside wiring 94. I have made a side-by-side comparison of ADSL and 10Base-T in the presence of noise by another computer simulation. The noise was modeled as additive white noise (AWGN) with a flat power spectrum. As in the previous simulation, 10Base-T signals 61 were modeled as traveling through 100 meters of Category 3 type cable. The ADSL signals were modeled as frequency division multiplexed, trellis-coded, downstream Discrete MultiTone (DMT) transmitted with standard parameters and received with noise consisting of 20 self-NEXT disturbers and AWGN with varying power. Two downstream ADSL systems were simulated, 6 Mb/s over a 12 kilofeet 24 gauge loop plus 100 meters of Category 3 cable, and 1.5 Mb/s over 18 kilofeet 24 gauge plus 100 meters of Category 3 cable. As a result of the simulation, I have found that 10Base-T has about 55 dB greater noise immunity to residential noise than ADSL.

The above description is exemplary of my invention. Numerous modifications and variations may be made by those skilled in the art without departing from the scope and spirit of my invention.

I claim:
1. A method for simultaneously distributing within a service location narrowband and broadband signals present at the service location, the distribution within the service location being over in-house four wire cable to different termination devices within the service location, said different devices including at least one telephone and at least one broadband service termination device, said method comprising the steps of:
   in response to the broadband signals generating within the service location broadband digital signals operating at frequencies greater than 1,000,000 HZ (1 MHz);
   combining said narrowband and said broadband digital signals at a first broadband transceiver within the service location; and uncombining said narrowband and said broadband digital signals at a second broadband transceiver within the service location; and applying within the service location the narrowband and broadband digital signals egressing the second broadband transceiver separately to the appropriate termination devices over the in-house four wire cable.

2. The method according to claim 1 further comprising the step of repeating said combining, uncombining, and applying steps until the narrowband and broadband digital signals reach each termination device within the service location.

3. The method according to claim 1 wherein said combining step comprises frequency division multiplexing.

4. The method according to claim 1 wherein said uncombining step comprises frequency division demultiplexing.

5. The method according to claim 4 wherein said telephone and broadband signals present at the service location are received at the service location over a twisted wire pair from a central office, said method further comprising the step of receiving and separating within the service location the narrow-band and broadband signals received from the central office.

6. The method according to claim 5 wherein the narrowband and broadband signals are received at the service location over an asymmetric; digital subscriber line.

7. The method according to claim 5 further comprising the step of repeating said combining, uncombining, and applying steps until the narowband ands broadband digital signals reach each termination device with the service location.

8. A system for simultaneously transmitting within a service location telephone and broadband signals present at the service location, said signals being distributed through in-house four wire cabling to different termination devices within the service location, said different termination devices including at least a telephone and a broadband service termination device, said system comprising:

means within the Service location for receiving said broadband signals and for locally generating broadband digital signals operating at frequencies greater than 1,000,00 Hz (1 MHz);

at least one first transceiver within the service location for combining said telephone signals and said broadband digital signals from said receiving and generating means and for transmitting the combined signals over the in-house four wire cabling; and at least one second transceiver within the service location for separating said broadband digital signals and said telephone signals and for applying said telephone signals to a telephone and said broadband digital signals to a broadband service termination device.

9. The system in accordance with claim 8 wherein said telephone and broadband signals present at the service location are received from a central office over a twisted wire pair between the central office and the service location, said system further comprising:

splitter means at the subscriber location for separating said broadband signals and said telephone signals received from the central office, said splitter means being connected both to said means for receiving said broadband signals and for locally generating said broadband digital signals and to said at least one first transceiver means.

10. The system in accordance with claim 9 wherein said broadband signals received from the central office are asymmetric digital subscriber line (ASDL) signals.

11. A system in accordance with claim 9 further comprising means connected to said splitter means for directly applying said telephone signals to a second telephone.

12. A system in accordance with claim 9 further comprising a plurality of first transceivers for combining said telephone signals from said splitter means and said broadband digital signals and transmitting the combined signals over different in-house four wire cabling and a plurality of said second transceivers for applying said telephone signals to a plurality of telephones and said broadband digital signals to a plurality of broadband service termination devices.

13. A system in accordance with claim 8 further comprising means connected to said means for locally generating the broadband digital signals for directly applying said broadband digital signals to a second broadband service termination device.

14. A system in accordance with claim 8 wherein the locally generated broadband digital signal is a 10Base-T signal.

15. A system in accordance with claim 8 wherein said means for locally generating comprises a broadband hub and said hub and cabling are configured in a star topology with said hub at the center of the star.

* * * * *

UNITED STATES PATENT AND TRADEMARK OFFICE
CERTIFICATE OF CORRECTION

PATENT NO. : 6,430,199 B1
DATED : August 6, 2002
INVENTOR(S) : Kenneth James Kerpez It is certified that error appears in the above-identified patent and that said Letters Patent is hereby corrected as shown below:

Column 7,
Line 28, change "ands" to -- and --.
Line 37, change "Service" to -- service --.
Line 40, change "1,000,00" to -- 1,000,000 --.

Column 8,
Line 1, after "at least one second transceiver" insert -- distinct from said first transceiver and --.
Line 11, after "splitter means" insert -- distinct from said first and second transceivers and --.
Line 20, change "(ASDL)" to -- (ADSL) --.

Signed and Sealed this

Third Day of January, 2006

JON W. DUDAS
*Director of the United States Patent and Trademark Office*